June 30, 1942. A. J. TRAUMÜLLER, SR 2,288,305
HOOK MOUNTING
Filed April 1, 1941
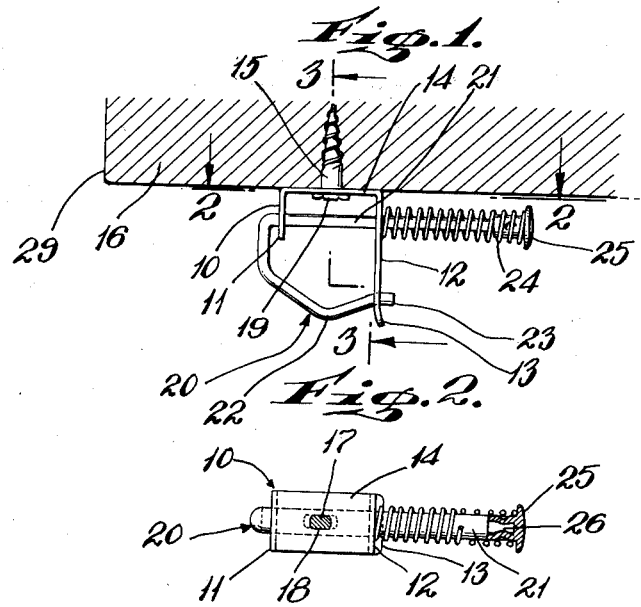
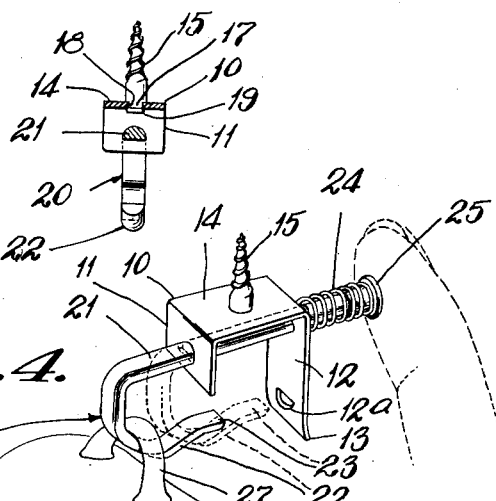
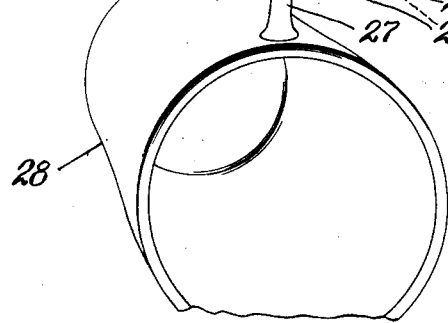
INVENTOR
ARTHUR J. TRAUMÜLLER, SR.
BY
ATTORNEY Patented June 30, 1942

2,288,305

UNITED STATES PATENT OFFICE 2,288,305

HOOK MOUNTING

Arthur J. Traumüller, Sr., Brooklyn, N. Y.

Application April 1, 1941, Serial No. 386,226

5 Claims. (Cl. 248—307)

This invention relates to articles of manufacture in the form of supporting hooks for various types and kinds of devices and more particularly to hooks for supporting coffee cups, tea cups and the like, and the object of the invention is to provide a device of this class comprising a bracket portion preferably including an integral screw for mounting the bracket in connection with a support with a hook movably and yieldably supported in the bracket and cooperating with one part of the bracket to form a closed loop or eye preventing accidental displacement of an article from the device, while at the same time facilitating a quick and simple one-hand attachment and detachment of the article with respect to the hook. A further object being to provide a device of the class described in the form of a U-shaped or channel bracket with a long shank on a hook part slidably engaging spaced walls of the channel bracket with a spring on said shank and cooperating with the bracket to normally support the hook in closed position with respect to one side wall of the bracket; and with these and other objects in view the invention consists of a supporting device of the class and for the purposes specified, which is simple in construction, efficient in use and which is constructed as hereinafter described and claimed.

The invention is fully disclosed in the following specification, of which the accompanying drawing forms a part, in which the separate parts of my invention are designated by suitable reference characters in each of the views: and in which:

Fig. 1 is a sectional view through a support showing one of my improved devices in side elevation arranged thereon.

Fig. 2 is a partial section on the line 2—2 of Fig. 1 showing part of the structure broken away.

Fig. 3 is a section on the line 3—3 of Fig. 1 showing the device detached, and;

Fig. 4 is a view illustrating a manner of operating the device in attaching or detaching a cup.

In supporting various types and kinds of articles, and particularly in supporting such things as cups, it has been customary to employ open hooks, and in recent years spring hook devices have also been employed, but in all such instances it has been possible to accidentally displace the cup from its support even when the various types of spring hooks have been used, and it is the object of my invention to provide a supporting device of the character described wherein the cup or other article is permanently retained against accidental displacement and can be released only upon manual operation of the hook to move the same into an open position. It might also be well at this time to point out that various types of spring hooks are not desirable or practical particularly when it is desirable to support fine china having dainty handle portions. My device adapts itself for use in supporting any type and kind of cups by reason of the fact that the cup is manually inserted on, and removed from, the hook when the hook is manually moved into open position. While the invention is described primarily, by way of example, as a cup supporting device, it will be understood that this device is adapted for use in supporting any type and kind of article where hanging or suspending is desirable and where need of protection against accidental displacement of the supported article is also desirable.

In the construction shown the device comprises a channeled bracket portion 10 having a short side wall 11 and a longer side wall 12, the latter flaring outwardly at its end as seen at 13, note Fig. 1. To the back or crosshead 14 of the bracket is permanently secured and keyed a mounting screw or other fastening 15 for securing the bracket to a suitable support partially indicated at section at 16 in Fig. 1 of the drawing. It will be noted from a consideration of Fig. 2 of the drawing that the shank 17 of the screw is flattened so as to be keyed in an elongated aperture 18 in the crosshead 14. The screw end is riveted over as seen at 19 on the inner surface of the crosshead 14 in retaining the screw against displacement.

At 20 is shown the supporting hook. This hook is formed preferably from a half-round rod shaped to form a long, straight shank portion 21 which operates in apertures formed in the walls 11 and 12 as will clearly appear upon a consideration of Fig. 3 of the drawing. Thus the rod is keyed against rotary movement in the bracket and the downwardly, inwardly and upwardly curved or bent hook portion 22 is maintained in definite relationship with respect to the bracket 10 as will be apparent. The hook portion 22 terminates in an outwardly extending end 23 which passes through the aperture 12a in the wall 12 when the device is in normal or closed position and held in this position by a coil spring 24 arranged upon the shank 21. The inner end of the spring bears against the wall 12 of the bracket and the outer end bears on a button 25 the sleeve of which is compressed onto the shank 21 as seen at 26 in Fig. 2 in permanently retaining the button 25 on the end of said shank.

When the hook member 20 is in normal position a closed loop is formed thereof in conjunction with the part 12, thus when the handle 27 of a cup or other article 28 is arranged on the hook 20, the handle 27 is actually disposed in a closed loop thus accidental displacement of the cup from the hook is positively prevented.

In arranging the supporting device upon the lower surface of a shelf or other support for suspending the cups therefrom, it is preferred that the shank portion 21 of the device be arranged at right angles to the front or outer edge 29 of the shelf with that part of the shank having the spring 24 thereon extending rearwardly, thus in looking into a closet, cabinet or the like, the only thing that would be visible would be the narrow surface of the bracket walls 11 and 12 and the surface of the hook member, the cups being arranged with their sides visible inwardly through the closet or cabinet.

With this type of safety hook, cups may be mounted in a closer environment with respect to each other than has been heretofore possible, particularly from the standpoint of the assurance of non-displacement of the cups, and it is thus possible to arrange a greater number of cups in a given area. In mounting a cup in position the cup is held in the hand with the handle member of the cup directed upwardly and then one finger of that hand is arranged upon the button 25 as indicated in dotted lines in Fig. 4 of the drawing, and the hook is moved forwardly into open position and a position similar to that indicated in dotted lines in Fig. 4 of the drawing is sufficient. When the handle 27 of the cup is arranged upon the hook pressure of the finger upon the button 25 is released and the hook will then automatically move into closed position similar to that shown in Fig. 1 with the end 23 of the hook extending through the aperture 12a. Upon disengaging the cup the above operation is reversed and in other words the cup is grasped in the hand and the finger is then applied to the button 25 to open the hook, the cup is then disengaged from the hook and the hook is then allowed to return to closed position.

In the event that the hook should be extended forwardly to the full line position shown in Fig. 4, it will appear that in this operation the handle 27 clears the narrow wall 11 and accidental displacement of the cup is prevented. However it is preferred to limit the opening movement of the hook to position such as indicated in dotted lines in Fig. 4 so that the handle of the cup 27 may be freely raised within the channeled bracket. As a matter of fact, the operation of removing a cup would best be followed by first raising the cup within the boundaries of the closed loop, the bottom portion of the hook strikes the outer surface of the cup proper and thereafter moving the hook into open position which would provide an automatic disengagement.

As before stated, the device may be used for supporting articles of various kinds and classes where articles have supporting loops, hooks or other devices, and the position of the supporting hook may be varied in connection with the support, that is to say the crosshead of the bracket 14 may be arranged upon a vertical surface as well as in horizontal surface, or in fact upon an inclined surface, and the article may be supported from any part of the hook portion 22. A device of this type and kind will find its usefulness in various kinds of stores for supporting merchandise on display, particularly wherein it is desirable to maintain the merchandise against accidental displacement.

Where the supporting or mounting hook is used as a means suspending relatively heavy articles from a horizontal surface, it will appear that the load is taken up directly through the walls 11 and 12 by reason of the extension 23 passing through the aperture 12a of the wall 12. When the device is used simply to support light articles such as cups it will not be necessary to provide the engagement of the extension 23 with the aperture 12a. In such latter instances an abutting engagement between the end of the hook and the wall is all that is necessary as will be apparent.

When the device is used to support articles from the part of the hook arranged at right angles to the shank, the weight of the article will be taken up by the spring 24 until such time as the spring has been fully compressed. This may be desirable in what may be termed tensional mounting of predetermined articles or products.

Having fully described my invention, what I claim as new and desire to secure by Letters Patent is:

1. A device of the class described comprising a hook member having a long shank portion, a supporting plate for coupling the hook member with a support, said plate having spaced walls in which the shank of the hook is keyed and slidably mounted, the hook extending outwardly beyond one of said walls, said shank protruding outwardly beyond the other of said walls, an enlarged head on the outer end of the shank, and a coil spring mounted between said head and the last named wall operating to normally support the hook member in a closed position with the free end of the hook member forming in conjunction with the last mentioned wall a closed loop.

2. An article supporting device of the class described comprising a mounting plate having spaced short and long wall members, a rod keyed to and slidably engaging said spaced wall members, one end of the rod being offset to form a hook part which in conjunction with the long wall member forms a substantially closed loop, and a coil spring mounted on said rod and engaging said rod and one of said wall members to normally support the hook part in closed position.

3. An article supporting device of the class described comprising a mounting plate having spaced short and long wall members, a rod keyed to and slidably engaging said spaced wall members, one end of the rod being offset to form a hook part which in conjunction with the long wall member forms a substantially closed loop, a coil spring mounted on said rod engaging said rod and one of said wall members to normally support the hook part in closed position, and a screw secured to the mounting plate and projecting therefrom for attaching the plate to a suitable support.

4. A device of the class described comprising a channel-shaped mounting plate having spaced depending walls, means for securing the plate to a suitable support, a hook member having a long shank portion slidably engaging the spaced walls of said plate, said hook member having a free end portion registering with one of said walls to normally form a closed loop, means supporting the hook member in closed position, and said last named means being manually operable to move the hook to open position.

5. A device of the class described comprising a channel-shaped mounting plate having spaced depending walls, means for securing the plate to a suitable support, a hook member having a long shank portion slidably engaging the spaced walls of said plate, said hook member having a free end portion registering with an aperture formed in one of said walls to form a closed loop, means resiliently supporting the hook member in closed position, and a finger engaging portion on said hook member for manually depressing said resilient means to move the hook into open position.

ARTHUR J. TRAUMÜLLER, Sr.